(12) United States Patent
Bisson et al.

(10) Patent No.: US 6,349,092 B1
(45) Date of Patent: Feb. 19, 2002

(54) BLSR NODE EXTENSION

(75) Inventors: Patrick R. Bisson, Rohnert Park; Paul M. Elliott, Jenner; Kate B. Amon, Fremont; Anurag Nigam, Mountain View; Phu S. Le, Rohnert Park, all of CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/192,975

(22) Filed: Nov. 16, 1998

(51) Int. Cl.[7] ............................................. H04L 12/28
(52) U.S. Cl. ...................................... 370/258; 370/470
(58) Field of Search ................................. 370/254, 255, 370/257, 258, 389, 392, 393, 401, 402, 403, 404, 405, 408, 409, 470, 471, 472, 473, 474, 475, 539, 541

(56) References Cited

U.S. PATENT DOCUMENTS

| | | | | |
|---|---|---|---|---|
| 5,341,364 A | * | 8/1994 | Marra et al. | 370/223 |
| 5,394,389 A | * | 2/1995 | Kremer | 370/223 |
| 5,901,137 A | * | 5/1999 | Nakabayashi | 370/222 |

* cited by examiner

*Primary Examiner*—Kwang B. Yao
(74) *Attorney, Agent, or Firm*—Skjerven Morrill MacPherson LLP; Tom Chen

(57) ABSTRACT

The present invention provides a method and structure for allowing more than 16 nodes to be configured in a single SONET BLSR network by utilizing unused portions of the transport overhead of an STS-N frame to expand the node identification field from 4 bits to 8 bits, thereby allowing up to 256 nodes to be present on a single ring.

10 Claims, 4 Drawing Sheets

|  | ← N*3 Columns → | ← N*87 Columns → |
|---|---|---|

| A1 | A1 | A1 | A2 | A2 | A2 | J0 | Z0 | Z0 |
|----|----|----|----|----|----|----|----|----|
| B1 | NA | NA | E1 | NA | NA | F1 | NA | NA |
| D1 | NA | NA | D2 | NA | NA | D3 | NA | NA |
| H1 | H1 | H1 | H2 | H2 | H2 | H3 | H3 | H3 |
| B2 | B2 | B2 | K1 | NA | NA | K2 | NA | NA |
| D4 | NA | NA | D5 | NA | NA | D6 | NA | NA |
| D7 | NA | NA | D8 | NA | NA | D9 | NA | NA |
| D10| NA | NA | D11| NA | NA | D12| NA | NA |
| S1 | Z1 | Z1 | Z2 | Z2 | M1 | E2 | NA | NA |

9 Rows — PAYLOAD

BLSR NODE EXTENSION

BACKGROUND

1. Field of Invention

The present invention relates generally to the Synchronous Optical Network (SONET), and more particularly to Bi-directional Line Switched Rings (BLSRs) for SONET.

2. Related Art

A conventional asynchronous digital hierarchy for carrying digitized voice signals over twisted wire consists of digital stream (DS) levels, with a DS0 signal carrying a single voice channel and being the lowest level in the hierarchy with a bit rate of 64 kbps. The lower level digital signals are multiplexed into higher level digital signals. For example, 24 DS0 signals are multiplexed to form a DS1 signal, which has a bit rate of 1.544 Mbps and carries 24 single voice channels, and 28 DS1 signals are multiplexed to form a DS3 signal, which each have a bit rate of 44.736 Mbps and carry 672 (24*28) single voice channels. Currently, multiplexing to form DS3 and lower level signals is asynchronous and uses multiple stages. For example, when DS1 signals are multiplexed into a DS2 signal, extra bits (bit stuffing) are added to account for data rate variations in the individual signals. Then, when the DS2 signal is multiplexed into a DS3 signal, bit stuffing is again used.

While bit stuffing allows independently clocked input signals to be transmitted, bit stuffing also makes it nearly impossible to locate individual DS1 or DS0 signals/channels within a DS3 signal. To extract a single channel, a DS3 signal would need to first be demultiplexed into 28 DS1 signals before the channels could be switched or rearranged. The appropriate DS1 signal would then also need to be demultiplexed to locate the desired DS0 signal. As a result, the process of adding or deleting channels is expensive and inefficient. Asynchronous multiplexing also increases overhead and requires a large number of multiplexers and digital cross-connects.

Recently, a standard called Synchronous Optical Network or SONET has been developed for carrying synchronous signals with different bit rates and capacities between different fiber optic systems using a byte-interleaved multiplexing scheme. SONET was developed, in part, because of the numerous advantages of data transmission through fiber optic systems, such as very high bandwidth capacity and long communication distances without repeaters or regenerators.

SONET defines various levels of Synchronous Transport Signals (STS), with the lowest level or base signal designated STS-1 having a data rate of 51.84 Mbps. Higher level signals, STS-N, are integer multiples of the STS-1 signal and are formed by byte-interleaving N STS-1 signals. SONET network elements (NEs) combine STS-1 signals as needed to form an STS-N signal and then convert the STS-N electrical signals to an Optical Carrier (OC) signal and transmit the OC-N signal over optical fiber.

In existing networks when there is a need to extract a lower speed signal from a high speed line or insert a lower speed signal into a high speed line, the lower speed signals must be completely demultiplexed or multiplexed, respectively, before being passed on. Multiplexing and demultiplexing can become very expensive as the number of low speed signals that are used increases. SONET overcomes this problem through the use of synchronous multiplexing and Add/Drop Multiplexers (ADMs), which allow low speed signals to be added or dropped without demultiplexing the entire signal.

In contrast to asynchronous multiplexing, the SONET standard supports greater capacity and efficiency. In the SONET multiplexing format, the basic signal transmission rate STS-1 operates at 51.84 Mbps. An STS-1 can carry 28 DS1 signals or one asynchronous DS3 signal. STS-1 signals are then multiplexed to produce higher bit rate signals STS-2, STS-3, etc. As mentioned above, the other term used to define SONET signal levels is Optical Carrier. The bit rates are the same with both STS and OC signals, i.e., the bit rate of the STS-1 equals the bit rate of the OC-1, with the only difference being the type of signal that is referenced. For example, if the signal is in an electrical format, the signal is referred to as STS, while, if the signal is in an optical format, the signal is referred to as OC.

Regardless of whether STS or OC signals are being transported by SONET, a major objective with SONET is to increase the survivability of the network. Because of the large bandwidth capabilities with optical fiber and the growing volume of data traffic, data transmission disruptions can result in serious consequences with the operation of the network. Communication between two nodes or links can be disrupted due to cable cuts or node failures, for example. Several types of network topologies have been used to enhance the survivability of the network, such as point-to-point systems incorporating route diversity, in which two nodes employ an alternate communication path with regenerators in the event the primary path experiences a communication disruption. These types of topologies, while designed to be survivable, can increase the number of multiplexers and the length and number of cable required, as well as possible network elements, such as regenerators or optical amplifiers in order to make the necessary connections between communication nodes.

A much more preferred topology for SONET are self-healing ring (SHR) architectures, in which the nodes are connected in a ring configuration. Duplicate signals are transmitted along two paths, a working path and a protection path. When a communication is disrupted along the working path, the protection path is selected to allow the data transmission to continue to the desired destination node or nodes. SHRs include uni-directional path switched rings (UPSRs) and bi-directional line switched rings (BLSRs).

For USPRs, adjacent nodes on the ring are connected with a single optical fiber carrying data through the nodes of the network in a clockwise direction and a single optical fiber carrying data in a counter-clockwise direction. One fiber represents the working path and the other represents the protection path. For BLSRs, the working path and the protection path travel along the both directions in the ring. If a fiber cut in the working path or a node failure occurs, data transmission is switched to the protection path. Such architectures take advantage of the capability provided by synchronous multiplexing in SONET to eliminate the need to backhaul traffic to central hubs. Thus, at each switching node, the SONET transport node directly accesses the required time slots in the bit stream through the use of modified (ADMs).

SONET ring topology permits the creation of highly survivable networks and results in cost savings since it can be much less expensive for carriers to install a fiber ring than to deploy point-to-point links. Due to the advantages of BLSR configurations for SONET networks and an increasing number of users subscribing to SONET networks, more and more traffic terminating nodes may he desired or required on a single BLSR network. However, current SONET ring topology for BLSRs only allow a ring configuration having a maximum of sixteen traffic terminating nodes.

Accordingly, a SONET BLSR topology is desired which is allows more than sixteen nodes to be connected in a ring network.

SUMMARY

The present invention provides a method and structure to allow more than 16 nodes on a SONET bi-directional line switched ring (BLSR) network by utilizing unused portions of the transport overhead to expand the node identification field from four to eight bits.

In one embodiment, a third APS channel byte K3 is allocated to the byte location at the fifth row and second column of the transport overhead from the second STS-1 signal. In the current SONET BLSR standard, the destination and source nodes on the ring are identified by the four least significant bits (0–3) of the K1 byte and the four most significant bits (4–7) of the K2 byte, respectively, which allows a maximum of $2^4$ or 16 nodes to be identified on the ring. The node identification field is expanded by using the four least significant bits (0–3) of the K3 byte for the K1 node identification and the four most significant bits (4–7) of the K3 byte for the K2 node identification. As a result, node identification is expanded to $2^8$ or 256 possible values, thereby allowing up to 256 nodes on a single ring.

The present invention will be more fully understood in light of the following detailed description taken together with the accompanying drawings.

BRIEF DESCRIPTION OF DRAWINGS

Note that use of the same reference numbers in different figures indicates the same or like elements.

DETAILED DESCRIPTION

The present invention provides a method to allow more than sixteen traffic terminating nodes to be configured in a SONET bi-directional line-switched ring (BLSR) network by utilizing unused bytes in the SONET overhead to designate additional nodes in the ring.

Figure 1:
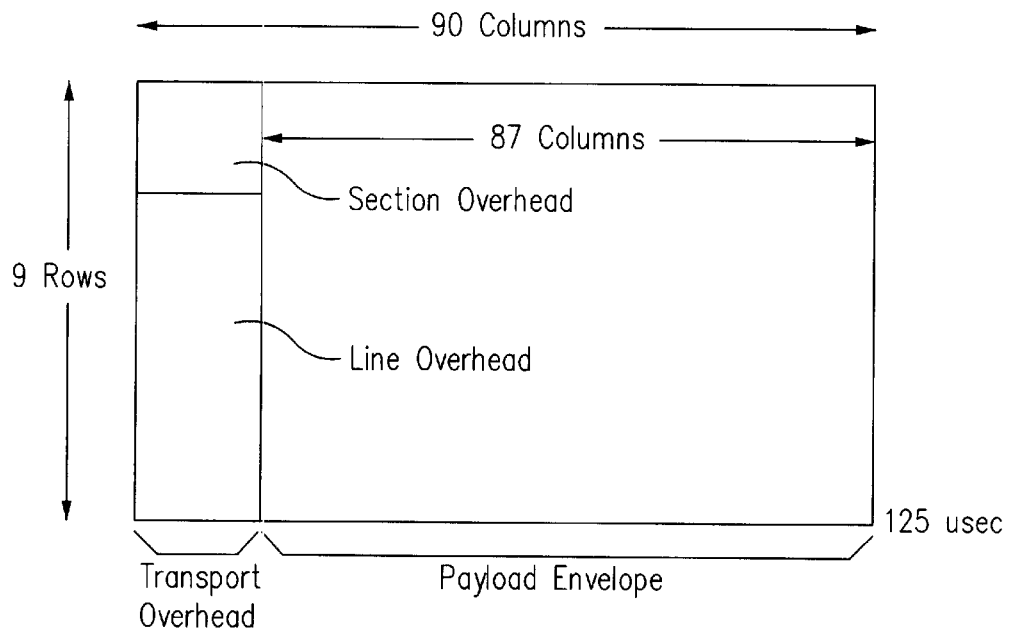
FIG. 1 shows the frame format of the SONET STS-1 signal.

Synchronous Optical Network (SONET) defines a transmission hierarchy of optical carrier (OC) levels and electrically equivalent synchronous transport signals (STSs) for transmission over optical fiber. SONET uses a base transmission signal designated STS-1 with a line rate of 51.84 Mbps. The frame format of the base STS-1 signal is shown in FIG. 1. An STS-1 frame has 90 columns and 9 rows, with the column size being one byte, resulting in a frame size of 810 bytes. The STS-1 signal is transmitted byte-by-byte from column one to column 90 of row one then from column one to column 90 of row two, and proceeding in this manner to the last byte at row nine, column 90. An entire STS-1 frame is transmitted every 125 μsec for a frame rate of 8000 frames/sec, resulting in the basic STS-1 line rate of 51.84 Mbps.

The first three columns of the STS-1 frame consist of transport overhead, and the remaining 87 columns consist of the synchronous payload envelope (SPE). As shown in FIG. 1, the transport overhead, which carries signaling and protocol data, is composed of section overhead and line overhead. Section overhead is used for communications between adjacent network elements, and line overhead is used for higher level STS-N signals between the STS-N multiplexers. The first three rows or nine bytes of transport overhead are for the section overhead, and the remaining six rows or 18 bytes are for the line overhead. The SPE, whose capacity is 50.115 Mbps (9 rows*87 columns*8000 frames/sec*8 bits/byte), carries the information portion of the signal. The first column of the SPE contains the path overhead.

Figure 2:
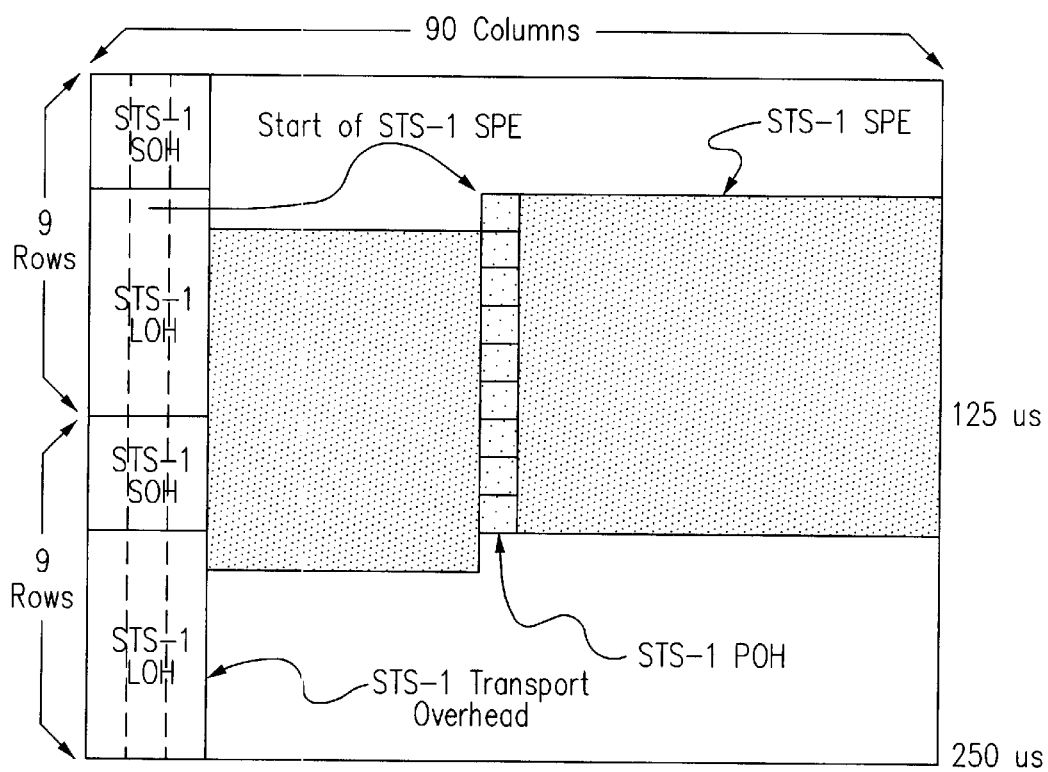
FIG. 2 shows two successive STS-1 frames, with the payload spanning both frames.

In SONET, each STS-1 frame is transmitted every 125 μsec, regardless of whether data exits in the frame. Since the data from an STS-1 signal arrives asynchronously, data carried in the SPE can start anywhere in the SPE and is not fixed relative to the SONET frame. FIG. 2 shows two successive STS-1 frames, where the STS-1 SPE of the first frame, does not start at the beginneing of the STS-1 SPE, i.e., at row one, column 4, but rather with the first byte of the path overhead at row 4 and somewhere after column 4 in the first frame and ends with the last byte of the SPE at row 4 and somewhere befor column 90 in the next frame. Payload pointers in the line overhead of the first frame are used to indicate the starting address of the data. Consequently, individual STS SPEs do not need to be aligned before interleaving.

The STS-1 frames can accommodate up to 28 digital stream level one (DS1) signals or one DS3 signal. Higher level signals are obtained by synchronous multiplexing lower level signals. SONET optical carrier levels, along with corresponding bit rates and the number of DS voice channels supported by the associated optical level, are shown in Table 1 below.

TABLE 1

| OC-N level | Bit rate (Mbps) | Number of DS0s | Number of DS1s | Number of DS3s |
| --- | --- | --- | --- | --- |
| 1 | 51.84 | 672 | 28 | 1 |
| 3 | 155.52 | 2016 | 84 | 3 |
| 6 | 311.04 | 4032 | 168 | 6 |
| 9 | 466.56 | 6048 | 252 | 9 |
| 12 | 622.08 | 8064 | 336 | 12 |
| 18 | 933.12 | 12096 | 504 | 18 |
| 24 | 1244.16 | 16128 | 672 | 24 |
| 36 | 1866.24 | 24192 | 1008 | 36 |
| 48 | 2488.32 | 32256 | 1344 | 48 |
| 96 | 4976.00 | 64512 | 2688 | 96 |
| 192 | 9952.00 | 129024 | 5376 | 192 |

SONET uses synchronous multiplexing to combine different types of signals, from low speed voice to high speed data and video. Signals are mapped into the SPE of the STS-1 signal. Multiple STS-1 signals are then byte-interleaved and multiplexed into higher level STS-N signals. For example, an STS-3/OC-3 signal is formed by multiplexing three STS-1/OC-1 signals. The line rate of an STS-1 signal is 51.84 Mbps and the line rate of an STS-3 signal is 155.52 Mbps, which is exactly three times the rate of the STS-1 signal. The electrical STS-N signals can then be directly converted to optical OC-N signals for transport along optic fiber.

SONET also defines synchronous signals known as virtual tributaries (VTs) to transport lower speed signals. VTs operate at four levels below STS-1. The four defined sizes of VTs are VT-1.5 (1.728 Mbps) for DS1 signals, VT-2 (2.304 Mbps) for CEPT-1 signals, VT-3 (3.456 Mbps) for DS1C signals, and VT-6 (6.912 Mbps) for DS2 signals. Within an STS-1 frame, each VT occupies a portion of the frame. Within the STS-1, different VT groups can be mixed together to form one STS-1 payload.

Figures 3, 4:
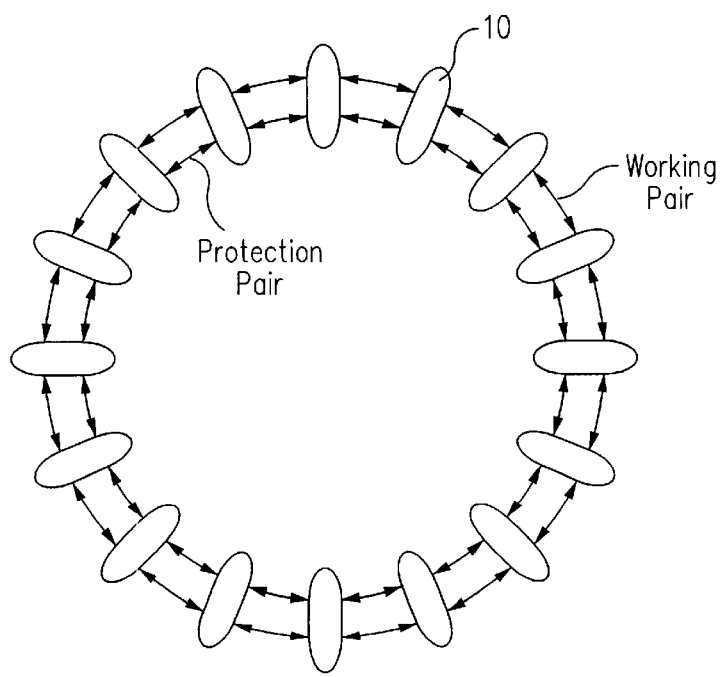
FIG. 3 shows the transport overhead for an STS-3 frame.
FIG. 4 shows a 16-node four-fiber BLSR.

Once STS-1 signals are formed, multiple STS-1 signals can be multiplexed to fully utilize the high data rates available in fiber optic networks. Higher level STS-N signals are formed by byte-interleaving N STS-1 signals. In a synchronous SONET environment, multiple STS-1 signals travel together at a higher rate, but are still distinguishable as individual STS-1 signals as a result of byte-interleaving. Byte-interleaving, as defined by SONET, is a procedure for interlacing the individual bytes of a signal such that each component signal is visible within the combined signal, which eliminates the need to completely demultiplex an STS-N signal in order to access a single STS-1 signal, When STS-1 signals are interleaved, the transport overhead is first frame aligned and then byte-interleaved to form the STS-N signal. As mentioned above, the STS SPEs do not need to be aligned due to the use of payload pointers in the aligned transport overhead. FIG. 3 shows the resulting transport overhead after multiplexing three STS-1 signals. In general, when N STS-1 signals are multiplexed, the transport overhead is N*3 columns and the SPE is N*87 columns. The transport overhead for the first STS-1 signal is in columns one, four, and seven, the transport overhead for the second STS-1 signal is in columns two, five, and eight, and the transport overhead for the third STS-1 signal is in columns three, six, and nine. As shown in FIG. 3, not all the overhead is defined or needed.

Section overhead occupies the first three rows of the transport overhead. Two framing bytes A1 and A2, for each STS-1 signal, indicate the beginning of each corresponding STS-1 frame. A section trace byte J0 is used for the first STS-1 signal, and a section growth byte Z0 is used for each succeeding STS-1 signal in an STS-N frame. A section bit interleaved parity code (BIP-8) byte B1 is used for section error monitoring. The B1 byte is calculated over all bits of the previous STS-N frame after scrambling using a bit interleaving parity 8 code with even parity. Each piece of section equipment calculates the B1 byte of the current STS-N frame and compares the value with the B1 byte received from the first STS-1 of the next STS-N frame. If the B1 bytes match, there is no error. If the B1 bytes do not match and the threshold is reached, then an alarm indicator is set. The B1 byte is only defined for the first STS-1 signal and is undefined for the rest of the STS-N frame.

An orderwire byte E1 is used as a local orderwire channel for voice communication. One byte is transmitted at a rate of 64 kbps (8 bits/125 μsec), which is the rate of a voice frequency signal. The E1 byte is only defined for the first STS-1 signal. A section user channel byte F1 is set aside for the user's purpose. The F1 byte is terminated at each section terminating node on the line, allowing the byte to be read and/or written at each section terminating node. Like the other bytes on line two, the F1 byte is only defined for the first STS-1 signal. Line three is allocated to section data communications channel (DCC) bytes D1, D2, and D3, which is a 192 kbps (24 bits/125 μsec) message channel that can be used for operations, administration, maintenance, and provisioning (OAM&P) between two section terminating nodes. The D1, D2, and D3 bytes are only defined for the first STS-1 signal.

The line overhead occupies the last six rows of the transport overhead. Two STS payload pointers H1 and H2 are used for each STS-1 signal of an STS-N frame to indicate the offset in the bytes between the pointer and the first byte of the corresponding STS-1 SPE in order to locate the corresponding STS-1 SPE. The pointer is used to align each STS-1 SPE in the STS-N signal as well as to perform frequency justification. The first pointer bytes contain the actual pointer to the SPE, and the following pointer bytes contain the linking indicator. A pointer action byte H3 is used for each STS-1 signal of an STS-N frame for frequency justification purposes.

A line bit-interleaved parity code (BIP-8) byte B2 in each of the STS-1 signals of an STS-N frame is used for line error monitoring function. Similar to the B1 byte in the section overhead, the B2 byte also uses bit interleaving parity 8 code with even parity. It contains the result from the calculation of all the bits of line overhead and STS-1 envelope capacity of the previous STS-1 frame before scrambling. Two automatic protection switching (APS) channel bytes K1 and K2 are allocated for APS signaling between line terminating nodes for line level bi-directional APS, i.e., BLSR networks. The K1 and K2 bytes are defined only for the first STS-1 signal of an STS-N frame.

Nine line data communications channel (DCC) bytes D4–D12 are allocated for a message channel from a central location for OAM&P information between two line-level section terminating nodes. The nine bytes D4–D12 form a 576 kbps (9*8 bits/125 μsec) message-based channel and are only defined for the first STS-1 signal of an STS-N frame. The first column from the last row of the transport overhead is allocated for a synchronization status byte S1, which is designated only for the first STS-1 signal of the STS-N frame. Growth bytes Z1 are allocated to the remaining STS-1 signals for future growth, i.e., functions not yet defined. Growth bytes Z2 are located in the first and second STS-1 signals of an STS-3 frame, and in the first, second, and fourth through Nth STS-1 signals of an STS-N frame. An STS-N REI-L byte M1 is used for a line remote error indication (REI-L) function, which conveys the error count detected by a line terminating node using the line BIP-8 code. The M1 byte is located in the third STS-1 signal of an STS-N frame. A second orderwire byte E2 is allocated for orderwire between line entities, and is also defined only for the first STS-1 signal of an STS-N frame.

In a BLSR network, APS channel bytes K1 and K2 each contain four bits designating a particular node on the ring, which allows for a maximum 16-node ($2^4$) ring, as shown in FIG. 4. K1 denotes the destination node, while K2 denotes the source node. FIG. 4 shows a four-fiber BLSR with sixteen nodes 10 connected by an outer working fiber pair and an inner protection fiber pair with each pair having one fiber carrying traffic in the clockwise direction and another fiber carrying traffic in the counter-clockwise direction.

Figure 5:
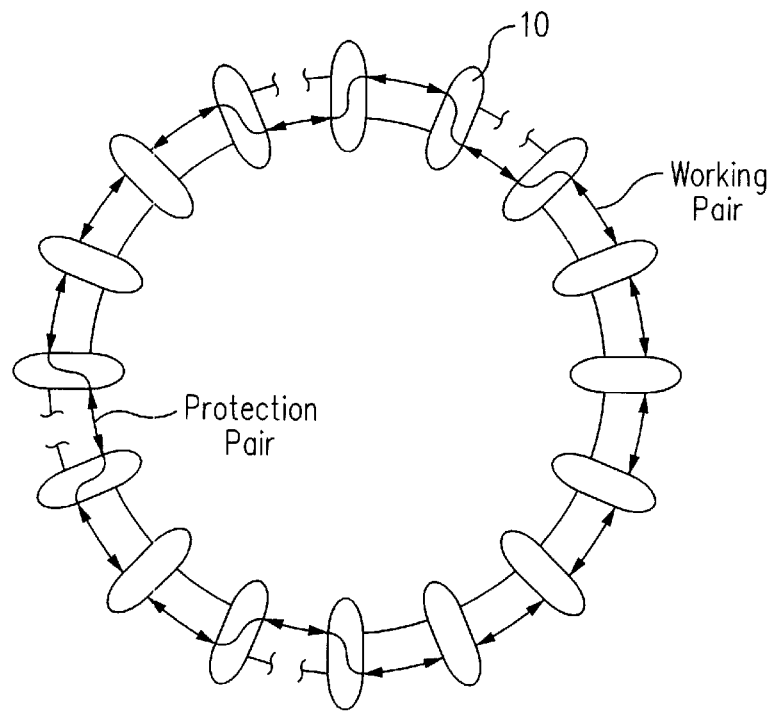
FIG. 5 shows span switching for the BLSR of FIG. 4.

When a communication disruption occurs, the four-fiber BLSR supports two types of switching, span switching and ring switching. Span switching routes traffic to the protection pair only along paths where disruptions in the working pair occur. Span switching allows traffic to flow even when multiple faults are occurring simultaneously along sections of the working fiber pair, as shown in FIG. 5. If the working pair of fibers between two nodes or ADMs fails, then the traffic is switched to the corresponding protection pair. The traffic in the working pair between other ADMs remains unswitched, and therefore unaffected. If multiple working pairs fail between various ADMs, then multiple span switches can exist simultaneously with some sections operating on the protection pair and others operating on the working pair with no negative impact on the network as a whole.

Figure 6:
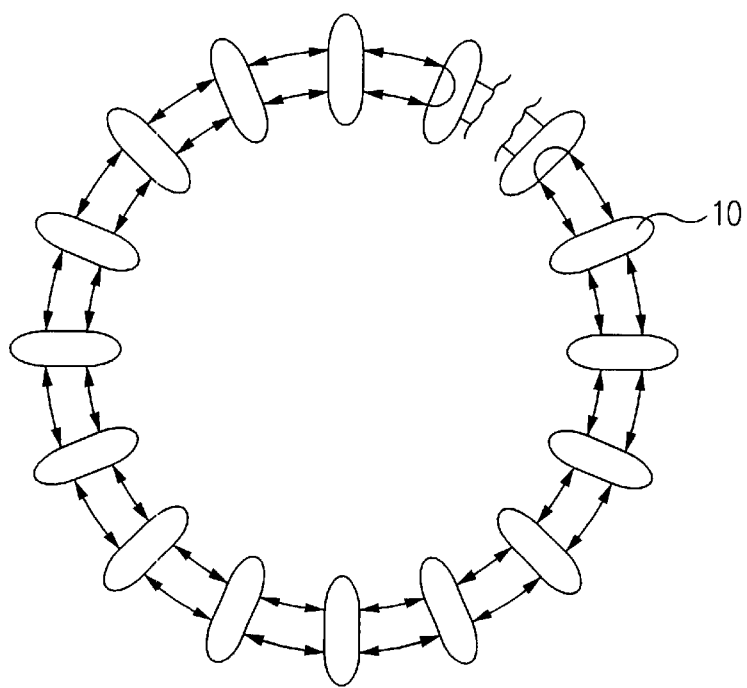
FIG. 6 shows ring switching for the BLSR of FIG. 4.

However, if both the working pair and protection pair between two ADMs or nodes fail, then ring switching is initiated, as shown in FIG. 6. The ADMs on each side of the failure will reroute traffic intended for the failed working pair to the protection pair heading in the opposite direction. The new, longer path is then used to deliver traffic to the destination node.

Figure 7:
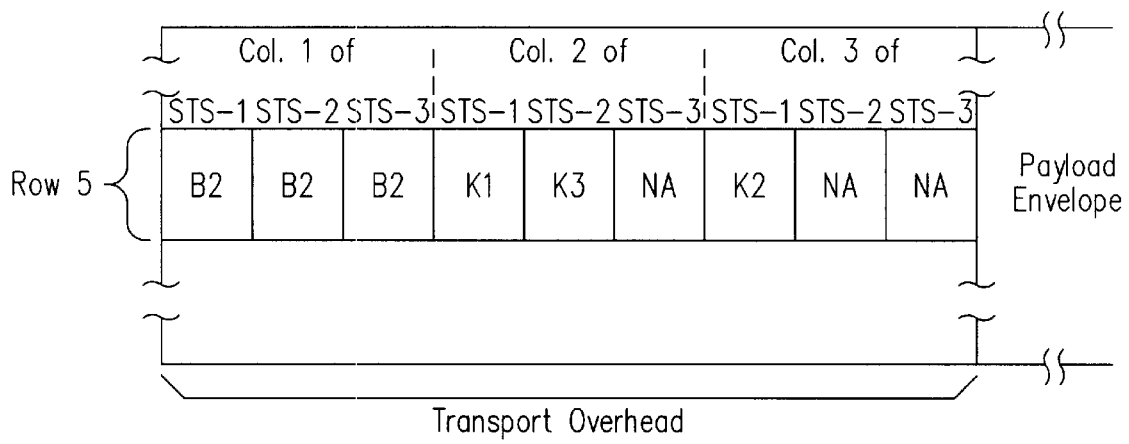
FIG. 7 shows a portion of the transport overhead for an STS-3 frame according to one embodiment of the present invention.
Figure 8:
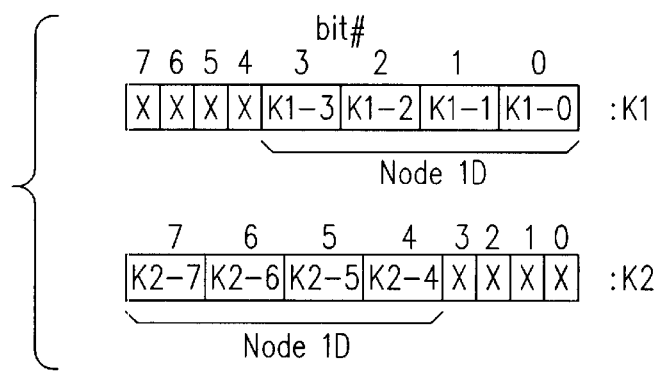
FIG. 8 shows the node identification locations of the K1 and K2 bytes.

As mentioned above, the line overhead of an STS-N frame only allows up to 16 nodes to be placed on a BLSR network. According to the present invention, unused bytes in the line overhead are used to expand the node identification field for increasing the number of nodes available for a BLSR. FIG. 7 shows a portion of the transport overhead for an STS-3 frame according to one embodiment. An additional APS channel byte, K3, is located in the second column of the second STS-1 signal in an STS-3 frame. Note that the K3 byte can be located at other unused byte locations in the transport overhead, e.g., at positions shown as "NA" in FIG. 3. In the current standard, bits 0–3 or the four least significant bits in the K1 byte (labeled K1-0 to K1-3 in FIG. 8) are used to designate the one of 16 nodes on the ring as the destination node, and bits 4–7 or the four most significant bits in the K2 byte (labeled K2-4 to K2-7) are used to designate one of 16 nodes on the ring as the source node for APS.

Figure 9:
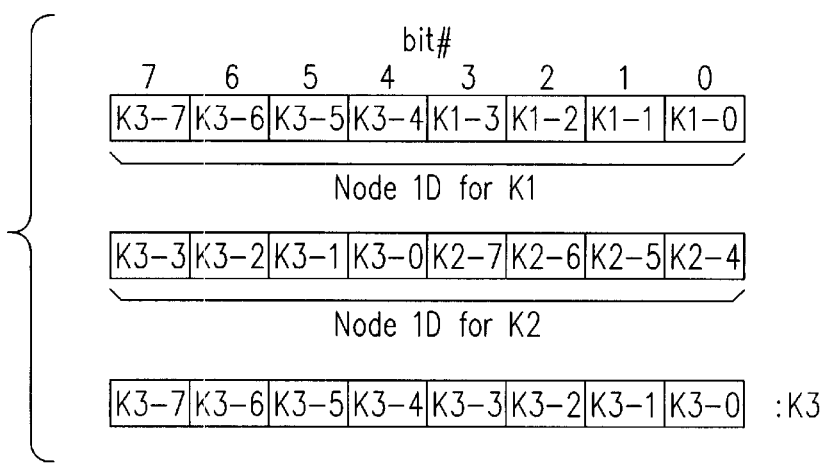
FIG. 9 shows the expanded node identification field the K1 and K2 bytes according to one embodiment of the present invention.

In this embodiment, bits 4–7 or the four most significant bits in the new K3 byte (K3-4 to K3-7) are used to expand the K1 byte node identification, and bits 0–3 or the four least significant bits in the K3 byte (K3-0 to K3-3) are used to expand the K2 byte node identification. For the expanded K1 node identification, the first four bits 0–3 come from bits 0–3 of the K1 byte and the last four bits 4–7 come from bits 4–7 of the K3 byte. For the expanded K2 node identification, the first four bits 0–3 come from bits 4–7 of the K2 byte and the last four bits 4–7 come from bits 0–3 of the K3 byte. The expanded node identification field for the K1 and K2 byte is shown in FIG. 9, along with the new K3 byte. As a result, the node identification for the K1 and K2 byte has been expanded to 8 bits each, which allows $2^8$ or 256 nodes, rather than 16, to be identified on a BLSR for automatic protection switching. The K3 byte is otherwise similar to the K1 and K2 bytes, terminating at each node and following the same behavior regarding Idle, Pass-through, and switching states. The resulting BLSR, now with a maximum capacity of 256 nodes, operates in the same manner as the current BLSR networks with a maximum of 16 nodes.

The above-described embodiments of the present invention are merely meant to be illustrative and not limiting. It will thus be obvious to those skilled in the art that various changes and modifications may be made without departing from this invention in its broader aspects. For example, even though the specification described expanding the BLSR to 256 nodes, additional node expansion may be possible using additional unused bytes in the transport overhead. Therefore, the appended claims encompass all such changes and modifications as fall within the true spirit and scope of this invention.

We claim:

1. A method of expanding the number of nodes in a SONET BLSR network, comprising:

inserting an additional APS channel byte into an unused byte location of the transport overhead of an STS-N frame;

using a first portion of the additional APS channel byte to expand the node identification field for a first APS channel byte K1; and using a second portion of the additional APS channel byte to expand the node identification field for a second APS channel byte K2.

2. The method of claim 1, wherein the first portion is used as the four most significant bits in the expanded node identification field for the first APS channel byte K1 and the second portion is used as the four most significant bits in the expanded node identification field for the second APS channel byte K2.

3. The method of claim 1, wherein the first portion is four bits and the second portion is four bits.

4. The method of claim 1, wherein the expanded number of nodes is $2^{N+4}$, where N is the number of bits in each of the first and second portions.

5. The method of claim 4, wherein N=4.

6. A frame structure for a SONET STS-N frame, comprising:

a byte K3 in an unused byte location in the transport overhead of the STS-N frame, wherein a first portion of the byte K3 is used to expand the node identification field for a first APS channel byte K1 and a second portion of the byte K3 is used to expand the node identification field for a second APS channel byte K2.

7. The structure of claim 6, wherein the first portion is used as the four most significant bits in the expanded node identification field for the first APS channel byte K1 and the second portion is used as the four most significant bits in the expanded node identification field for the second APS channel byte K2.

8. The structure of claim 6, wherein the first portion is four bits and the second portion is four bits.

9. The structure of claim 6, wherein the expanded number of nodes is $2^{N+4}$, where N is the number of bits in each of the first and second portions.

10. The structure of claim 9, wherein N=4.

* * * * *